United States Patent
Donkersloot

[11] 3,952,528
[45] Apr. 27, 1976

[54] BOAT DOCK STRUCTURES

[76] Inventor: Arie Donkersloot, P.O. Box 50, St. James, Fla. 33956

[22] Filed: Mar. 28, 1974

[21] Appl. No.: 455,736

Related U.S. Application Data

[63] Continuation-in-part of Ser. No. 335,710, Feb. 26, 1973.

[52] U.S. Cl. .................................. 61/48; 14/71 R; 248/354 R
[51] Int. Cl.² .......................................... E02B 3/20
[58] Field of Search ............. 61/48; 14/71; 114/5 F; 248/413, 354

[56] References Cited
UNITED STATES PATENTS

| | | | |
|---|---|---|---|
| 1,672,102 | 6/1928 | Upson | 61/48 |
| 2,564,123 | 8/1951 | Melges et al. | 61/48 |
| 2,592,626 | 4/1952 | Wanless | 61/48 |
| 2,687,617 | 8/1954 | Newell | 61/48 |
| 2,924,191 | 2/1960 | Blumquist et al. | 61/48 X |
| 2,948,121 | 8/1960 | Karst | 61/48 |
| 3,292,892 | 12/1966 | Abbott | 248/354 R |
| 3,306,053 | 2/1967 | Fulton | 61/48 |
| 3,665,537 | 5/1972 | Turner | 14/71 |
| 3,735,440 | 5/1973 | Hetmanski | 14/71 |
| 3,747,354 | 7/1973 | Macomber | 61/48 |

Primary Examiner—Jacob Shapiro
Attorney, Agent, or Firm—Silverman & Cass, Ltd.

[57] ABSTRACT

A boat dock structure horizontally suspended on the edge of a shore of a body of water in a cantilever mode. Guard rail stanchions are fastened onto the top of the dock structure so that no part of the dock is in contact with the water. The dock structure may be connected to a pillar assembly which is adjustable in height.

17 Claims, 13 Drawing Figures

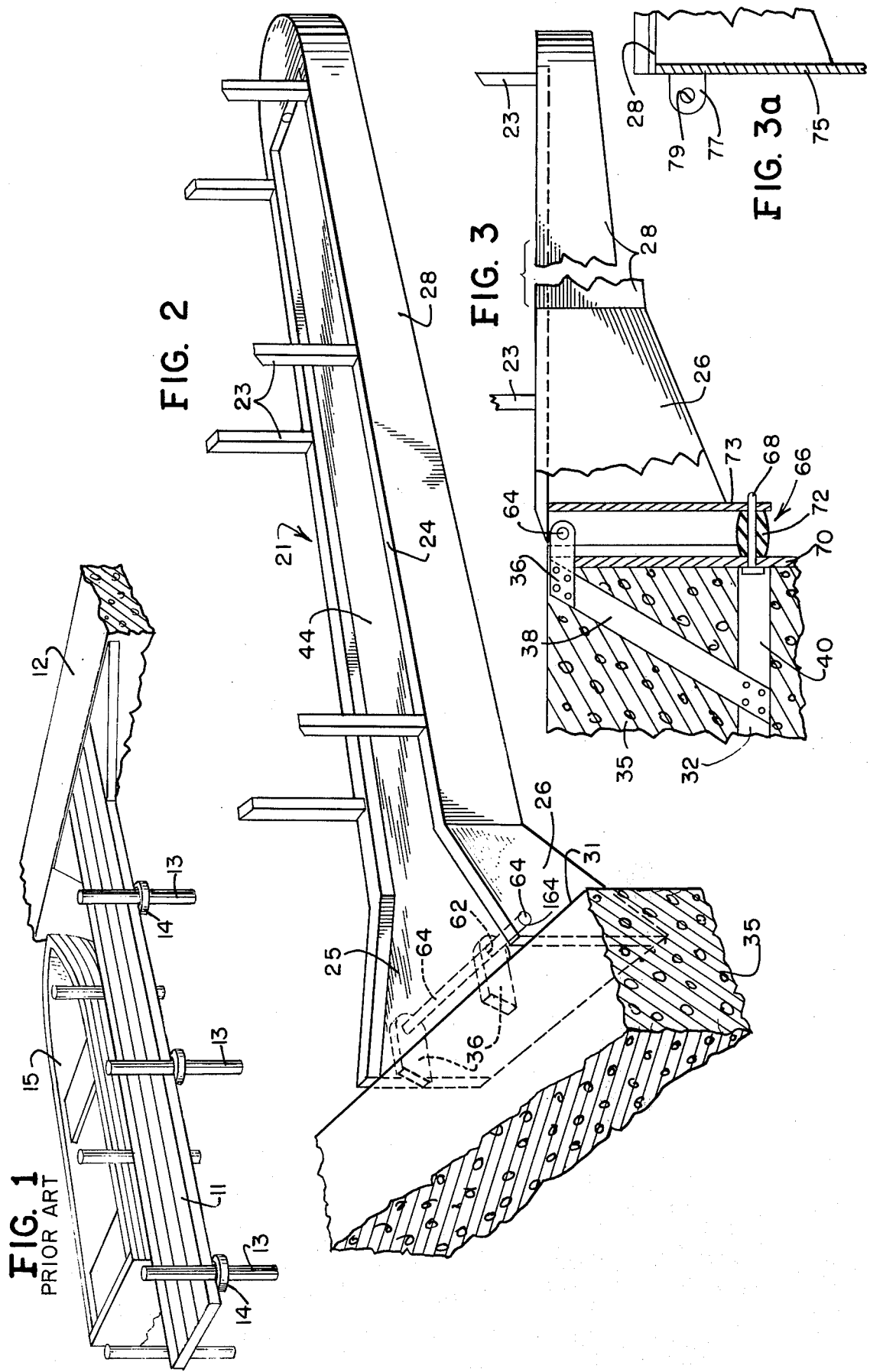

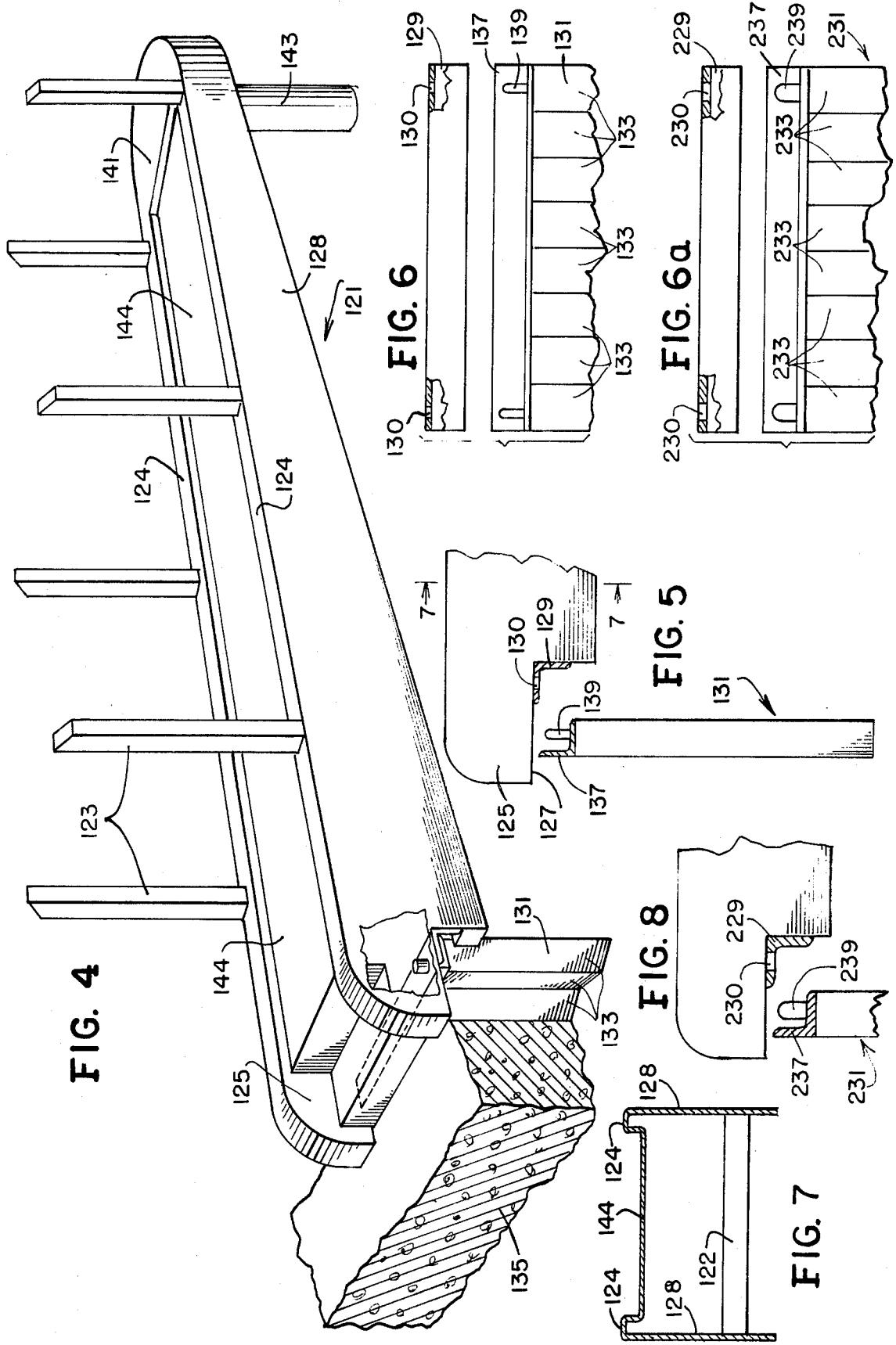

3,952,528

BOAT DOCK STRUCTURES

This application is a continuation-in-part of parent application Ser. No. 335,710 filed Feb. 26, 1973.

BACKGROUND OF THE INVENTION

This invention relates to the art of boat dock structures. This art is very old in the history of civilization.

The prior art shows many types of slips, wharfs, docks or like structures which are connected to the shore and comprise portions extending into the water either supported by buoys, floats, or by pilings which rest on the floor of the body of water. Also, there are pilings in the form of wooden logs on both sides of the dock, the logs serving the purpose of typing boats thereto.

It has long been known among members of boating circles that the structures of the prior art have certain drawbacks which reduce their usefulness. Among those drawbacks is the fact that the pilings supporting the docks are permanently within the water and are subject to erosion caused by water in summer and ice in winter. Similarly, the logs for tying the boats thereto suffer the same type of erosion.

Another disadvantage of the prior art dock structures is the frequently observed fact that through the action of waves, tides, and ice, the pilings and logs in the floor of the body of water are subjected to a slow process of loosening which leads to reduced stability and may even create dangers in the use of the docks.

The present invention avoids the noted drawbacks by a departure from the old concept of supporting the dock partly on the shore and partly on floating elements. The invention provides a dock structure that is anchored in a cantilever fashion in a reinforced section of the shore. The dock is under normal conditions always out of the water.

The invention also provides for guard rail stanchions being fastened onto the top of the dock on both sides thereof for tying the boats thereto. Such bumper guards make logs around and outside the dock superfluous. The anchoring of the dock in the reinforced shore section may be done in a rigid manner but may also be arranged such as to make the dock pivotable, between a horizontal and a vertical position. This provides the opportunity of removing the dock at the end of the boating season from the immediate influence of the water.

These and other advantages of the invention will be more clearly understood from a detailed description of the preferred embodiments as set forth below.

SUMMARY OF THE INVENTION

A boat dock structure to be secured to a concrete block at the edge of a shore by an anchoring device for suspending the dock in a cantilever mode. The dock may be pivotable for lifting the dock to a vertical position when desired. Guard rail stanchions onto the top surface of the dock enable tying boats thereto. A pillar adjustable in height is provided to adjust the height of the head portion of the dock.

DESCRIPTION OF THE DRAWINGS

FIG. 1 is a perspective view of a dock of the type used in the prior art;

FIG. 2 is a perspective view of a dock construction according to the invention;

FIG. 3 is a partial sectional view of the support arrangement for the dock of FIG. 2;

FIG. 3a is a side view of a part of a modified support arrangement for the dock;

FIG. 4 illustrates a perspective view of another embodiment of the invention;

FIG. 5 is a partial side view of the dock of FIG. 4 illustrating details of the support arrangement for the base of the dock;

FIG. 6 is a partial front view of the support arrangement of FIG. 5 showing the dock base for clearer presentation in an elevated position;

FIG. 6a is a partial front view similar to that of FIG. 6 but showing a heavier construction, obviating a pillar support for the front section of the dock.

FIG. 7 is a sectional view through the dock structure line 7—7 of FIG. 5;

FIG. 8 is a partial side view similar to FIG. 5 but showing the heavier construction of FIG. 6a.

DESCRIPTION OF THE PREFERRED EMBODIMENTS

Figure 9:
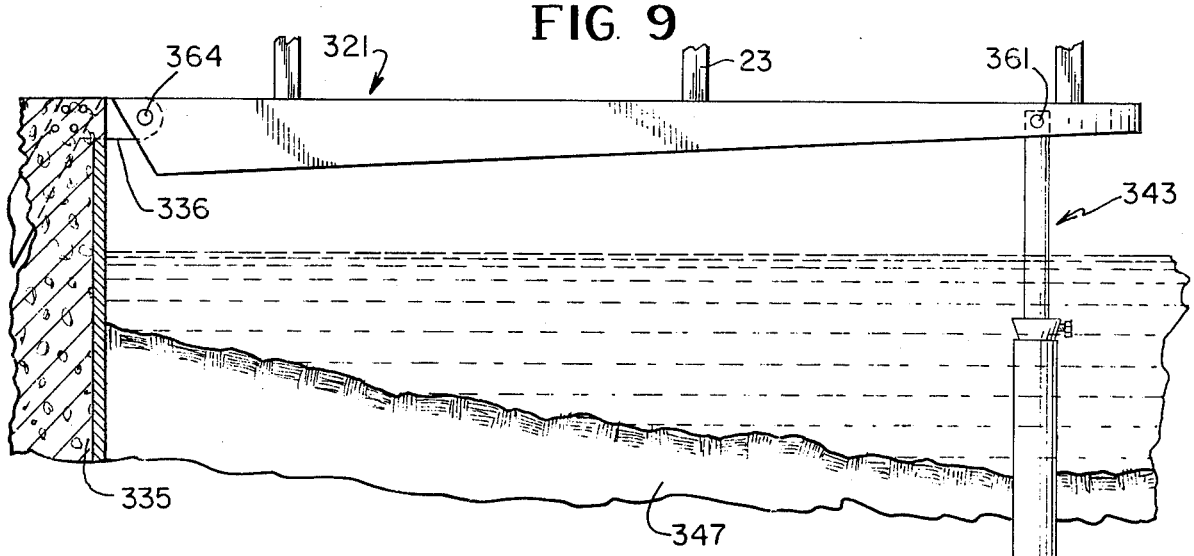
FIG. 9 is a side elevational view of a further embodiment of the invention.

Referring now to the drawings, FIG. 1 illustrates a dock structure as used in the prior art. The dock 11 generally made of wood is joined in a conventional manner to a structure 12 also generally of wood, which may be secured to the shore in one of a variety of ways. Pillars 13 of wood placed around the dock of wood were supported in the ground beneath the water. Often, the dock was provided with steel rings 14 on its side edges. The rings 14 encompass the pillars 13 and were of a diameter somewhat larger than that of the pillars so as to provide the dock with some latitude in moving between the pillars. A boat 15 could be tied by means of a rope to one of the pillars 13.

FIGS. 2 and 3 illustrate a dock structure according to the invention. The dock 21 is an elongate structure and formed of steel sheet portions welded together. A cross section of the dock is of generally reversed U-configuration, similar to that indicated in FIG. 7 of the drawings and described hereinafter.

An anchoring steel frame structure 32 for carrying the dock is firmly embedded in a concrete block 35, which has been poured in a recess of the soil at the edge of the shore. The anchoring structure 32 comprises steel sections 36, 38 and 40 which may be of usual steel profile types such as L, T, I, or U and are connected to one another by riveting or welding.

The steel sections 36 protrude from the concrete block 35 and are provided with aligned openings 62 for slidingly receiving a steel shaft 64, the ends of which are rigidly fastened as by riveting to the flaring out end portions 26 of the sidewalls 28 of the dock 21. For this purpose openings 164 are provided in said end portions of the side walls 28.

The dock 21 is suspended in cantilever form on the steel shaft 64. The lower ends of the end portions 26 are, due to the weight of the dock 21, abutting with a certain pressure the front wall 31 of the concrete block 35.

It will be appreciated that as a consequence of the suspension, the dock 21 is pivotable around the shaft 64. The dock 21 may be moved from the normal or horizontal position, as shown in the drawings, to a vertical position. Such motion may be desirable for removing the dock, as for instance, in winter time, from the closeness of the water. The method of lifting and repositioning the dock may be done by conventional means and is not described here.

In order to facilitate the repositioning of the dock, a cushioning device 66 is arranged at the lower end of the anchoring structure 32. It comprises a pair of bolts 68 fastened to a front steel section 70 of the anchoring structure which is secured to the front parts of the sections 40. Sleeve members 72 of elastomeric material are mounted around bolts 68 fastened to sections 40.

When the dock returns to the horizontal position a lateral wall 73 in the dock structure will, due to its weight compress the sleeve 72 which will yield and bulge outwardly as indicated in FIG. 3. After a full compression of the sleeve, it will expand slightly moving the dock to its final position.

An elongate recess 44 of rectangular configuration is provided along the upper surface of the dock. This recess is called in the professional circles "catwalk." It permits easy walking on the top of the dock and also contributes somehow to the strengthening of the sheet structure of the dock.

Guard rail stanchions 23 are affixed to the top rims 24 of the dock structure. As will be readily noted, the dock and the guard rail stanchions are normally outside the water.

In a slightly modified version, illustrated in FIG. 3a, the side walls 28 of the dock 21 may abut an end wall 75 of steel. A pair of steel ears 77 are welded to the wall 75 so as to project therefrom. Openings 79 are provided in the ears 77 and serve to receive the shaft 64.

FIGS. 4 to 6 illustrate another embodiment of the dock structure according to the invention. The dock structure 121 is similar to that of FIG. 2 and 3. The major distinctive feature between the two structures is the way of anchoring the base portion 125 of the dock as will be explained hereinafter.

A cross section of the structure has, as indicated heretofore, generally a reversed U-configuration as shown in FIG. 7. Reinforcing ribs 122 are welded to the side walls 128 of the dock. Guard rail stanchions 123 are fastened as by welding onto the top of both side rims 124 of the dock 121.

The dock is supported at the base portion 125 as well as the head portion 141 as will next be described.

As best seen in FIG. 5, the base 125 of the dock has an angular recess portion 127, and a section of angle iron 129 is fastened on by welding to the corner of the recess 127. Adjacent the ends of the angle iron 129, two openings 130 are provided for a purpose to be explained hereafter. As seen in FIGS. 4, 5, and 6, a support structure 131 is formed by a plurality of angle iron sections 133 arranged in a line of zigzag configuration. The structure 131 constitutes a boundary wall to a concrete block 135. An angle iron member 137 is connected by welding to the top of the structure 131. Adjacent the ends of the member 137 two steel pins 139 are welded thereto so as to vertically project therefrom.

The base portion 125 of the dock 121 is placed over the structure 131 so that the pins 139 can enter the openings 130.

The head portion 141 of the dock 121 may be placed over a pillar 143 preferably made of steel tubing and anchored in the ground beneath the water.

The dock 121 is now firmly supported at its base portion 125 and head portion 141.

Another embodiment, as illustrated in FIGS. 6a and 8, provides a more heavy-type construction of the anchoring elements. This, it is noted that the angle irons 229, 237 and the pins 239 have larger dimensions than those in FIGS. 5 and 6. With this heavier construction, there is no need to support the head portion 141 of the dock on a pillar 143. The dock is anchored in a cantilever fashion just as the first embodiment, i.e., the dock structure 21 shown in FIGS. 2 and 3.

Other features of the dock 121, such as the guard rail stanchions 123, the catwalk 143 are designed in the same manner as their counterparts of the dock 21 and are therefore not described here.

Figure 10:
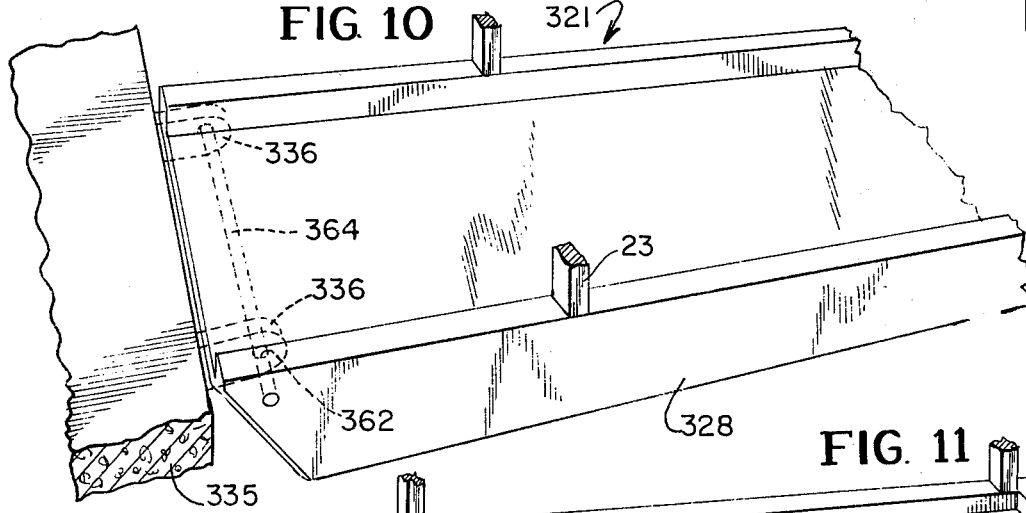
FIG. 10 is a partial perspective view of the base portion of the dock of FIG. 9.
Figure 11:
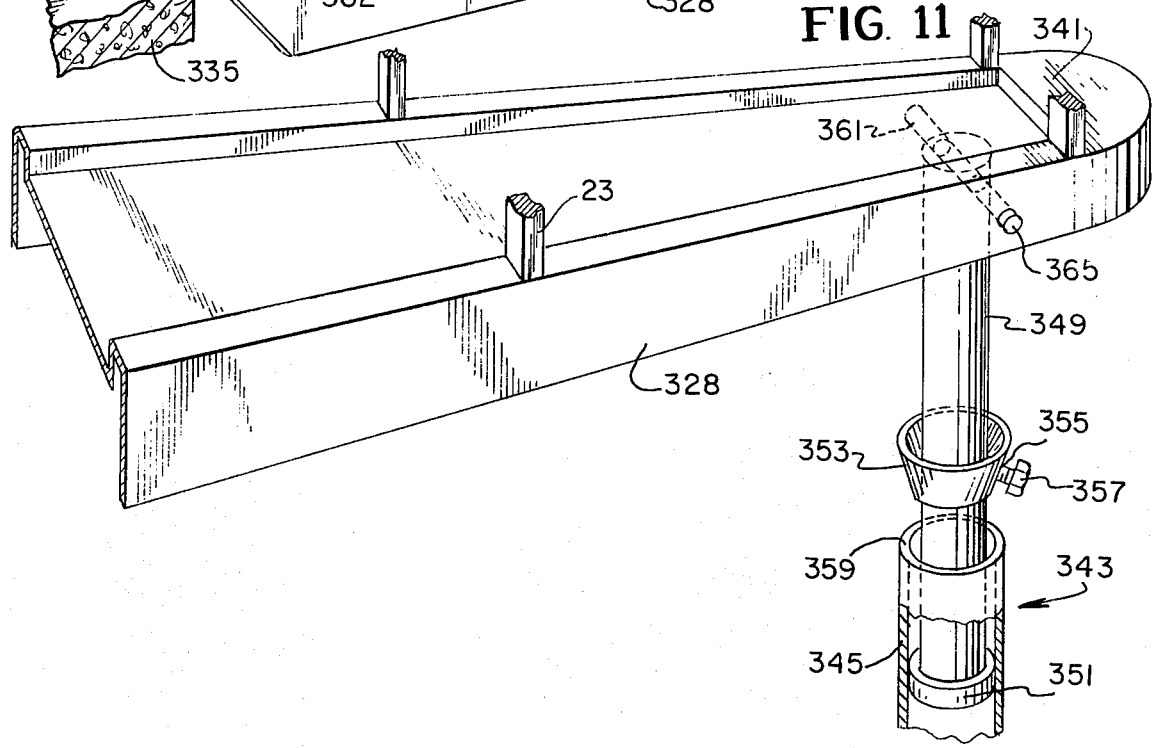
FIG. 11 is a partial perspective view of the front section of the dock of FIG. 9.

Referring now to FIGS. 9, 10 and 11, these illustrate a boat dock structure in which the head portion of the elongate body is hingedly connected to a tube pillar system preferably made of steel which provides adjustability in height.

The feature of adjustability includes a preliminary adjustment by means of a collar slidable on a tube and capable of being fixed in a desirable position by means of a set screw.

Further adjustment may be obtained by ice in winter tightening on a tube portion and lifting the dock with rising water, as will be explained in further detail hereinafter.

FIGS. 9, 10 shown the elongate body of the dock 321, the base portion 325 of the elongate body may be anchored in a wall 335 including a steel shaft 364 in opening 362 in steel sections 336 in a way similar to that shown in FIGS. 2 and 3 and is therefore not explained here.

The head portion 341 of the elongate body is hingedly connected to a tube system 343 as indicated in FIG. 11. The tube system 343 includes a base tube 345 which is driven into the ground 347 below the water.

An adjustable tube 349 is telescopically arranged in the base tube 345 and capable of sliding therein by means of a guide ring 351 fastened to the lower end of the adjustable tube 349. The outer diameter of the guide ring 351 is slightly smaller than the internal diameter of the base tube 345.

An adjustable collar 353 embraces the adjustable tube 349 and is provided with a threaded bore 355 and a threaded lock bolt 357 therein for setting the collar 353 at any desired position on the adjustable tube 349. It will be appreciated that the weight of the elongate body of the dock and the adjustable tube will cause the dock to move down until the collar is stopped by the upper end 359 of the base tube 345. The abutment of collar 353 with upper end 359 constitutes the lowest position of collar 353, however, it is not in the nature of a support for the head portion 341 since such is not required at all.

The connection between the adjustable tube 349 and the head portion 341 of the elongate body 321 is a hinge connection comprising a hinge pin 361, a bore at the upper end of the adjustable tube 349 for tightly fixing therein the hinge pin 361 and two openings 365 in the side walls 328 of the elongate body for receiving the ends of the hinge pin 361.

Guard rail stanchions 323 are arranged in a way analogous to the previously described embodiments and are therefore not shown or described here.

In operation, the adjustable tube pillar system allows first the adjusting of the tube system in accordance with the height of the water surface by setting the collar at a desirable position on the adjustable tube.

Second, by driving the base tube far enough into the ground below the water, ice will not have any effect on the base tube.

On the other hand, ice will tighten around the adjustable tube and when, in winter, the water rises it will lift the dock freely. The dock will fall back into the original position when ice disappears.

It is believed that the foregoing adequately will enable those skilled in the art to appreciate and practice this invention and, if necessary, make modifications which would fall within the scope of the invention as defined by the accompanying claims.

As an example, the dimensions of the dock structure may be selected to fit climatic and weather conditions, in particular the height of the concrete block may be chosen such as to keep the dock out of water notwithstanding tidal waves, floods and the like.

What is sought to be protected by United States Letters Patent is:

1. A boat dock structure secured to the ground of a shore of a body of water, said structure comprising:
    a. an elongate body, including a base portion and a head portion, including side walls the elongate body formed of steel sheet sections and having a rectangular cross section;
    b. means affixed to the shore ground for anchoring the elongate body therein;
    c. means associated with the base portion of the elongate body for connecting the base portion to the anchoring means, such as to hold the elongate body in a cantilever mode above the water surface,
    d. guard rail stanchions fastened to the top of the elongate body for tying boats to the dock,
    e. means anchored in the floor beneath the water for guidingly adjusting the height of the head portion of the elongate body, said last means including tube means,
    f. the tube means including:
        a base tube driven into the ground below the water and
        an adjustable tube comprising:
        1. means for connecting one end of the adjustable tube to the head portion of the elongate body,
        2. means for telescopically guiding the other end of the adjustable tub in the base tube, and
    g. an adjustable collar embracing the adjustable tube, and means for setting the collar at a predetermined position on the adjustable tube, wherein the overall height of the tube means can be adjusted at a desirable value.

2. The boat dock structure as set forth in claim 1, in which the means for connecting the one end of the adjustable tube to the head portion of the elongate body comprises:
    a. a hinge pin fastened to the top of the adjustable tube, and
    b. openings in the side walls of the elongate body for receiving said hinge pin.

3. The boat dock structure as set forth in claim 1, in which the telescopic guide means includes a guide ring fastened on the adjustable tube at the other end thereof and having an outer diameter slightly smaller than the inner diameter of the base tube, whereby the adjustable tube is capable of safely sliding within the base tube.

4. The boat dock structure as set forth in claim 1, in which the setting means include a threaded bore in the wall of the collar and a threaded lock bolt placed in the threaded bore for securing the collar in a predetermined position by tightening the lock bolt against the wall of the adjustable tube.

5. The boat dock structure as set forth in claim 1, in which the anchoring means comprises a concrete block sunk in a recess in the ground of the shore at the edge thereof, and a frame structure embedded in the concrete block, the frame structure including:
    a. at least two steel sections horizontally embedded in the lower part of the concrete block and forming the base portion of the frame structure;
    b. at least two steel sections horizontally embedded in the upper part of the concrete block and forming the head portion of the frame structure; and
    c. at least two steel sections constructed and arranged to be fastened to the steel sections of the base portion and the head portion of the frame structure.

6. The boat dock structure as set forth in claim 5, in which the steel sections embedded in the upper part of the concrete block are provided with ends projecting out of the concrete block, said projecting ends having aligned openings therein.

7. The boat dock structure as set forth in claim 6, in which the means on the base portion of the elongate body for connection to the anchoring means comprises:
    a. an opening in each of the side walls of the base portion of the elongate body;
    b. a steel shaft constructed and arranged to extend through the openings of the steel sections embedded in the upper part of the concrete block and the openings of the side walls of the base portion of the elongate body, whereby the elongate body is kept in a position suspended on the steel shaft and rotatable therearound, such that the elongate body can be raised when desired to a vertical position and lowered into a normal horizontal position.

8. The boat dock structure as set forth in claim 7, in which the steel sections embedded in the lower part of the concrete block are provided with means for guidingly cushioning the lower part of the side walls of the elongate body.

9. A boat dock structure secured to the ground of a shore of a body of water, said structure comprising:
    a. an elongate body, including a base portion and a head portion, the elongate body formed of steel sheet sections including side walls and having a rectangular cross section;
    b. means affixed to the shore ground for anchoring the elongate body therein;
    c. means associated with the base portion of the elongate body for connecting the base portion to the anchoring means, such as to hold the elongate body in a cantilever mode above the water surface,
    d. guard rail stanchions fastened to the top of the elongate body for tying boats to the dock,
    e. means anchored in the floor beneath the water for guidingly adjusting the height of the head portion of the elongate body, said last means including tube means,
    f. the tube means including: a base tube driven into the ground below the water and an adjustable tube comprising:
1. means for connecting one end of the adjustable tube to the head portion of the elongate body,
2. means for telescopically guiding the other end of the adjustable tube in the base tube, and g. an adjustable collar embracing the adjustable tube, and means for setting the collar at a predetermined position on the adjustable tube, wherein the overall height of the tube means can be adjusted at a desirable value, the anchoring means comprising:

a concrete block sunk in a recess in the ground of the shore at the edge thereof; and a steel wall secured at the front side of the concrete block, the anchoring means further comprises a frame structure embedded in the concrete block, the frame structure including:

at least two steel sections horizontally embedded in the lower part of the concrete block and forming the base portion of the frame structure;

at least two steel sections horizontally embedded in the upper part of the concrete block and forming the head portion of the frame structure; and at least two steel sections constructed and arranged to be fastened to the steel sections of the base portion and the head portion of the frame structure, the steel sections being embedded in the upper part of the concrete block are provided with openings in ends projecting out of the concrete block, the means on the base portion of the elongate body for connection to the anchoring means comprising:

an opening in each of the side walls of the base portion of the elongate body;

a steel shaft constructed and arranged to extend through the openings of the steel sections embedded in the upper part of the concrete block and the openings of the side walls of the base portion of the elongate body, whereby the elongate body is kept in a position suspended on the steel shaft and rotatable therearound, such that the elongate body can be raised when desired to a vertical position and lowered into a normal horizontal position, the steel sections being embedded in the lower part of the concrete block are provided with means for guidingly cushioning the lower part of the side walls of the elongate body, the cushioning means comprising:

at least two steel bolts secured to the lower steel sections such as to project therefrom;

at least two cylinder blocks formed of elastic material and arranged to embrace the steel bolts; and a vertical steel plate affixed to the base portion of the elongate body having at least two openings adjacent the bottom end for moving the steel plate over the bolts such as to compress the elastic cylinder blocks.

10. A boat dock structure secured to the ground of a shore of a body of water, said structure comprising:

a. an elongate body, including a base portion and a head portion, the elongate body formed of steel sheet sections and having a rectangular cross section;

b. means affixed to the shore ground for anchoring the elongate body therein;

c. means associated with the base portion of the elongate body for connecting the base portion to the anchoring means, such as to hold the elongate body in a cantilever mode above the water surface, d. guard rail stanchions fastened to the top of the elongate body for tying boats to the dock, e. means anchored in the floor beneath the water for guidingly adjusting the height of the head portion of the elongate body, said last means including tube means, f. the tube means including: a base tube driven into the ground below the water and an adjustable tube comprising:
1. means for connecting one end of the adjustable tube to the head portion of the elongate body,
2. means for telescopically guiding the other end of the adjustable tube in the base tube, and g. an adjustable collar embracing the adjustable tube, and means for setting the collar at a predetermined position on the adjustable tube, wherein the overall height of the tube means can be adjusted at a desirable value.

11. A boat dock structured to be secured to the ground of a shore of a body of water, said dock comprising:

a. an elongate body, including a base portion and a head portion, the elongate body formed of steel sheet sections including a top wall, two side walls and a bottom, and having a rectangular cross section;

b. means associated with the base portion of the elongate body for connecting the base portion to anchoring means on the ground, such as to hold the elongate body in a cantilever mode above the water surface, including:
1. an opening in each of the side walls of the base portion of the elongate body,
2. a steel shaft associated with the anchoring means on the ground, and traversing the openings in the side walls of the base portion whereby the elongate body is kept in a position suspended on the steel shaft and rotatable therearound, such that the elongate body can be raised when desired to a vertical position and lowered into a normal horizontal position,
3. the base portion of the elongate body, below said shaft, engaging said anchoring means in the normal horizontal position of the elongate body and, in conjunction with said shaft, maintaining said elongate body in said normal horizontal position, and c. guard rail stanchion means fastened to the top of the elongate body for tying boats to the dock.

12. A boat dock structure to be installed at a water situs such as a seashore, river bank or the like, wherein the dock structure is secured at the edge of the shore ground, said dock structure including a. an elongate body comprising a base portion and a head portion, the elongate body formed of steel sheet sections including a top wall, two side walls and a bottom such as to form a rectangular cross section, b. structural means embedded at the edge of the shore ground and constructed to receive the base portion of the elongate body, c. means associated with the base portion of the elongate body for pivotally connecting the base portion to the structural receiving means embedded at the shore, and
d. said pivotal connecting means enabling
  1. firm holding of the elongated body horizontally in a cantilever mode such as to extend over and above the body of water without touching the water, as desirable during the summer boating period, and
  2. pivoting the elongate body into a vertical position and held there when the dock is out of use such as during the winter period,
e. guide means hingedly connected to the head portion of the elongate body including telescopic tube means comprising adjustable setting means, wherein the overall height of the tube means and thus the head portion of the elongate body can be adjusted to be at a desirable value, and
f. individual guard rail stanchions and fastened to the top of the elongate body for tying boats to the dock.

13. A boat dock structure to be installed at a water situs such as a seashore, river bank or the like, wherein the dock structure is secured at the edge of the shore ground, said dock structure including:
a. an elongate body comprising a base portion at a first end thereof and a head portion at the second end thereof, the elongate body formed of steel sheet sections defining a top wall, two side walls and a bottom such as to form a generally rectangular cross section,
b. structural means embedded at the edge of the shore ground and constructed to receive the base portion of the elongate body, said structural means including a metal boundary wall,
c. connecting means directly engaged between the base portion of the elongate body and the boundary wall for rigidly affixing the base portion to the structural receiving means embedded at the shore,
  1. said connecting means including mating angular components affixed respectively to the metal boundary wall and the base portion, and means rigidly uniting said components to preclude movement therebetween,
  2. said connecting means firmly holding and supporting the elongate body horizontally such as to extend over and above the body of water without touching the water,
d. pillar means engaged with and depending from the head portion of the elongate body, said pillar means being anchored in the floor beneath the water and constituting in conjunction with the connecting means for connecting the base portion to the structural receiving means, the support structure for said elongate body, and
e. individual guard rail stanchions fastened to the top of the elongate body for tying boats to the dock.

14. The boat dock structure as set forth in claim 13 wherein said means rigidly uniting said components affixed respectively to the metal boundary wall and the base portion comprises at least two pins secured to the component affixed to the metal boundary wall and projecting vertically therefrom, the mating component affixed to the base portion comprising at least two openings therein structured to operably receive the vertically projecting pins.

15. The boat dock structure as set forth in claim 14 wherein each of said mating angular components has an L-shaped cross section.

16. The boat dock structure as set forth in claim 13, in which the anchoring means comprises:
a. a concrete block sunk in a recess in the ground of the shore at the edge thereof.

17. The boat dock structure as set forth in claim 16, in which the metal boundary wall comprises steel sections driven into the ground and arranged in a straight line mode.

* * * * *